United States Patent [19]

Shibata et al.

[11] 4,180,546
[45] Dec. 25, 1979

[54] PROCESS FOR REMOVING PHOSPHORUS FROM PHOSPHORUS-CONTAINING FLUORITE

[75] Inventors: Toshiyuki Shibata; Hiroshi Ono, both of Ube; Kenji Isoyama, Onoda, all of Japan

[73] Assignee: Central Glass Company, Limited, Ube, Japan

[21] Appl. No.: 926,016

[22] Filed: Jul. 19, 1978

[30] Foreign Application Priority Data

Jul. 21, 1977 [JP] Japan ................................. 52/86621

[51] Int. Cl.$^2$ .............................................. C01F 11/22
[52] U.S. Cl. ...................................... 423/178; 423/490
[58] Field of Search ................................. 423/178, 490

[56] References Cited

U.S. PATENT DOCUMENTS 3,065,050  11/1962  Baeumert .............................. 423/490

*Primary Examiner*—O. H. Vertiz
*Assistant Examiner*—Wayne A. Langel
*Attorney, Agent, or Firm*—Fleit & Jacobson

[57] ABSTRACT

A process for removing a phosphorus component from fluorite containing such phosphorus component, which process comprises adding powder of the fluorite to an aqueous acid solution having an acid concentration of from 1.0 to 20 Wt% in an inorganic acid/phosphorus ratio of above 25:1 by mole to give a slurry, agitating the slurry at a temperature below 50° C., and collecting the powder from the slurry. The mother liquor obtained after separation of the powder from the slurry may be recycled to the first step.

7 Claims, No Drawings

PROCESS FOR REMOVING PHOSPHORUS FROM PHOSPHORUS-CONTAINING FLUORITE

This invention relates generally to a metallurgic art and particularly to, a process for removing a phosphorus component or impurity from fluorite or fluorspar containing such phosphorus component therein.

Fluorite ordinarily employed in various chemical industries is of the so-called acid grade and has a purity of 95–98%. Such fluorite has a wide variety of applications, one of which is that the fluorite is decomposed with concentrated sulfuric acid under heating conditions to give hydrofluoric acid. This acid is metallurgically important as a starting material for producing aluminum fluoride, artificial cryolite, etc. Aluminum fluoride and cryolite are essential for the refining of aluminum, e.g. the production of 1 metric ton of aluminum metal needs 50 kg of cryolite and 30 kg of aluminum fluoride as fluxes.

It is well known that aluminum metal is produced by electrolysis of alumina, so that the power cost accounts for a major proportion of the production cost. It is also known that silicon dioxide ($SiO_2$) and phosphorus (P) which are inevitably contained in the aluminum fluoride derived from fluorite cause the consumption of the electric energy to undesirably increase on the electrolysis. In order to reduce the power cost, it is thus desirable that the contents of the impurities such as $SiO_2$ and P in the aluminum fluoride and cryolite are decreased to levels as low as possible. In an industrial sense, the aluminum fluoride is required to have the $SiO_2$ content not greater than 0.2% and the phosphorus content not greater than 0.02%. To meet the above requirement, the $SiO_2$ and P contents in fluorite which is one of the principal starting materials for producing aluminum fluoride should preferably be as low as possible. In practice, however, aluminum fluoride which is produced from commercially available fluorite contains much greater amounts of the impurities. To suppress the impurity contents to such low levels as indicated hereinbefore will need an additional and complicate process, if possible, thus increasing the production cost. Especially with the phosphorus component, there is not known any effective method of removing the phosphorus component from the aluminum fluoride.

It is accordingly an object of the present invention to provide a process for removing a phosphorus component from fluorite containing such component.

It is another object of the present invention to provide a process for producing highly pure fluorite which has a much reduced content of phosphorus and which is suitable for producing subsidiary materials, e.g. aluminum fluoride, for refining of aluminum.

The above objects can be achieved by a process according to the invention, the process comprising adding powder of fluorite containing the phosphorus component to an aqueous solution of an inorganic acid having an acid concentration of from 1.0 to 20 wt% in an inorganic acid/phosphorus ratio of above 25:1 by mole to give a slurry, agitating the slurry at a temperature below 50° C., and collecting the powder from the slurry.

The present invention will be described in detail below.

In the first step of the process according to the invention, the powder of fluorite is added to an aqueous solution of the inorganic acid. Any inorganic acids may be usable in the practice of the invention. In general, there are used as such acid sulfuric acid, hydrochloric acid, nitric acid, perchloric acid, chlorosulfuric acid and a mixture thereof.

As indicated above, the inorganic acid is used in such an amount that the inorganic acid/phosphorus molar ratio is in the range of above 25:1. The use of the acid in too great amount is not favorable since the acid is lost in vain. Preferably, the molar ratio is in the range of 30–300:1. Any concentration of the aqueous acid solution may be used but too high concentration is unfavorable since the reaction between the fluorite and the acid may proceed under conditions of such too high concentration. In addition, the use of too high concentration undesirable results in an increased concentration of the slurry. Thus, the acid concentration is generally in the range of 1.0–20 Wt%, preferably 2.5–20 Wt%. Any slurry concentration is usable unless the agitation is impeded but is preferably in the range of below 50 Wt% so as to facilitate an efficient agitation in a subsequent step.

The particle size of the starting fluorite powder gives more or less an influence on the rate of removal of the phosphorus component and is generally in the range of below 100μ though larger size may be used.

Then, the slurry is agitated or repulped by any of suitable means for permitting the phosphorus component to dissolve in the acid solution to a satisfactory. By the term "repulped" is meant an agitation of a slurry of powder by suitable means. The agitation or repulping generally conducted at temperatures below 50° C. Higher temperatures have the danger of inducing generation of hydrogen fluoride as the reaction between fluorite and the acid proceeds. Additionally, the rate of recovery of fluorite will be lowered when using higher temperatures. The agitation time is sufficient to be at least about 10 minutes. For complete removal of the phosphorus component, the agitation is preferably continued for 20 minutes or more.

Then, the powder is recovered from the slurry such as by filtration. The recovered powder is washed with water, if necessary. The mother liquor or filtrate obtained after separation of the powder from the slurry may be recycled to the first step for use as the aqueous acid solution. By this, the process of the invention is feasible in a closed system without a loss of acid.

The fluorite powder obtained according to the process of the invention as described hereinabove is remarkably reduced in phosphorus content to e.g. below 0.01 Wt% though the starting fluorite generally contains as high as about 0.1 Wt% of phosphorus. Even if all the phosphorus component contained in the thus purified fluorite is transferred to aluminum fluoride, the content of the phosphorus component in the aluminum fluoride is as low as below 0.015 Wt%, which is apparently less than the afore-indicated figure, i.e. 0.02 Wt%.

The present invention will be particularly described by way of the following examples, in which percentages are by weight.

EXAMPLE 1

500 g of fluorite powder having an average size of 50μ 1 and a composition of 96.69% of $CaF_2$, 0.57% of $CaCO_3$, 0.63% of $SiO_2$ and 0.03% of P was charged into a 5l stainless steel beaker, to which was further added 1.5 kg of 2.5% sulfuric acid. The slurry was agitated at a normal temperature for 30 minutes, followed by suckingly filtering by the use of the Buchner funnel, washing with water and drying to obtain 495 g of purified fluorite. The thus obtained fluorite had the following composition: 97.16% of $CaF_2$, 0.56% of $SiO_2$ and 0.009% of P.

In the above process, the $H_2SO_4/P$ molar ratio was 79.

COMPARATIVE EXAMPLE

Fluorite having the same composition as used in Example 1 was mixed with 340 g of 2.5% sulfuric acid to have a $H_2SO_4/P$ molar ratio of 18. The mixture was agitated at a normal temperature for 30 minutes, followed by suckingly filtering by the use of the Buchner funnel, washing with water and drying to obtain 496 g of purified fluorite. The fluorite had the following composition: 96.19% of $CaF_2$, 0.62% of $SiO_2$ and 0.024% of P.

EXAMPLE 2

500 g of fluorite powder having an average size of about $10\mu$ and a composition of 98.3% of $CaF_2$, 0.55% of $CaCO_3$, 0.815% of $SiO_2$ and 0.106% of P was charged into a 3l teflon beaker, to which was further added 1000 g of 10% hydrochloric acid. The mixture was agitated at 30° C. for 20 minutes, followed by suckingly filtering by the use of the Buchner funnel, washing with water and drying to obtain 492 g of purified fluorite. The purified fluorite had the following composition: 98.5% of $CaF_2$, 0.984% of $SiO_2$, and 0.009% of P.

In the above process, the HCl/P molar ratio was 160.

EXAMPLE 3

500 g of dried fluorite having an average size of $50\mu$ and a composition of 98.5% of $CaF_2$, 0.50% of $CaCO_3$, 0.82% of $SiO_2$ and 0.028% of P was charged into a 5l stainless steel beaker, to which was further added 1000 g of 2.5% sulfuric acid. The mixture was agitated at 18° C. for 40 minutes in a state of slurry. The slurry was suckingly filtered, washed with water and dried to obtain purified fluorite. On the other hand, the filtrate obtained by the filtration was again charged into the beaker, to which was added sulfuric acid to adjust its concentration to 2.5%. To the solution was further added 500 g of fresh fluorite, followed by repeating the above process. This recycling run was repeated further eight times. In the mother liquor, phosphorus dissolved out and accumulated, i.e. the mother liquor after completion of the ten cycles of the run contained 0.38% of phosphorus as $P_2O_5$. The purified fluorite obtained after each cycle had the following composition. In this example, the $H_2SO_4/P=56.5$(by mole) in each run.

| Cycle No. | $CaF_2$ | $SiO_2$ | F |
|---|---|---|---|
| 1 | 98.6 | 0.77 | 0.004 |
| 2 | 98.7 | 0.78 | 0.004 |
| 3 | 98.7 | 0.76 | 0.004 |
| 4 | 98.8 | 0.82 | 0.006 |
| 5 | 98.7 | 0.80 | 0.004 |
| 6 | 98.9 | 0.81 | 0.006 |
| 7 | 98.6 | 0.76 | 0.004 |

-continued

| Cycle No. | $CaF_2$ | $SiO_2$ | F |
|---|---|---|---|
| 8 | 98.6 | 0.76 | 0.004 |
| 9 | 98.6 | 0.77 | 0.004 |
| 10 | 98.6 | 0.78 | 0.004 |

EXAMPLE 4

Example 2 was repeated using 1000 g of 5% nitric acid instead of 10% hydrochloric acid. The resulting purified fluorite had the following composition: 98.42% of $CaF_2$; 0.77% of $SiO_2$; and 0.009% of P.

In this example, $HNO_3/P=46.4$(by mole)

EXAMPLE 5

500 g of fluorite powder having the same composition as used in Example 1 was added to 1500 g of an aqueous solution of a mixture of 1% hydrochloric acid and 2% nitric acid, followed by agitating at a normal temperature (20° C.) for 1 hour. The slurry was suckingly filtered by the use of the Buchner funnel, washed with water, and dried to obtain 496 g of purified fluorite. The fluorite had the following composition: 97.10% of $CaF_2$; 0.55% of $SiO_2$; and 0.007% of P.

In this example, mixed inorganic acid/P=183(by mole).

EXAMPLE 6

500 g of fluorite powder having an average size of $70\mu$ and a composition composed of 98.1% of $CaF_2$, 0.52% of $CaCO_3$, 0.58% of $SiO_2$, and 0.051% of P was charged into a 5l stainless steel beaker, to which was added 1 kg of 2.1% sulfuric acid, followed by agitating at room temperature for 40 minutes. Thereafter, the slurry was suckingly filtered by the use of the Buchner funnel, washed with water, and dried to obtain 497 g of purified fluorite. The fluorite had the following composition: 98.2% of $CaF_2$, 0.51% of $SiO_2$, and 0.008% of P. In this example, $H_2SO_4/P=26$(by mole).

What is claimed is:

1. A process for removing a phosphorus impurity from fluorite, the process comprising adding powder of fluorite containing the phosphorus impurity to an aqueous solution of an inorganic acid having an acid concentration of from 1.0 to 20 Wt% in an inorganic acid/phosphorus ratio of above 25:1 by mole to give a slurry, agitating the slurry at a temperature below 50° C., and collecting the powder from the slurry.

2. A process according to claim 1, wherein the inorganic acid/phosphorus ratio by mole is in the range of 30–300:1.

3. A process according to claim 1, wherein the powder content in the slurry is in the range of below 50%.

4. A process according to claim 1, wherein the powder is collected by filtration and then washed with water, and the resulting filtrate is recycled to the first step for use as the aqueous solution.

5. A process according to claim 1, wherein the powder has a particle size of below $100\mu$.

6. A process according to claim 1, wherein the agitation is continued for at least 10 minutes.

7. A process according to claim 1, wherein the acid concentration is in the range of from 2.5 to 20 Wt%.

* * * * *